UNITED STATES PATENT OFFICE.

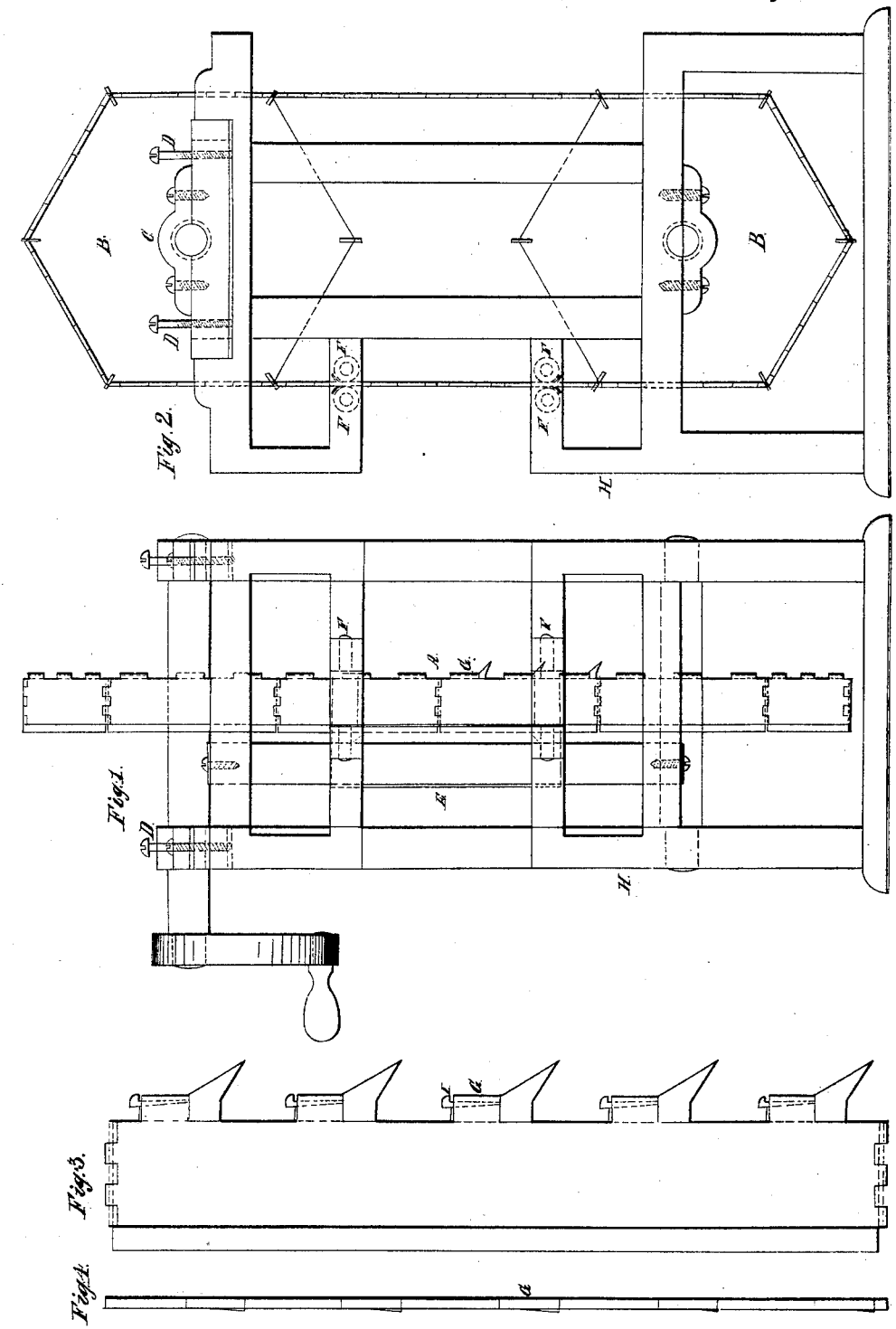

HARVEY BROWN, OF NEW YORK, N. Y.

ENDLESS SECTIONAL SAWING-MACHINE.

Specification of Letters Patent No. 21,482, dated September 14, 1858.

*To all whom it may concern:*

Be it known that I, HARVEY BROWN, of the city, county, and State of New York, have invented a new and useful Machine for Sawing Lumber; and I do hereby declare that the following is a full, clear, and exact description of the construction and operation of the same, reference being had to the annexed drawings, making a part of this specification, in which—

Figure 1 is a side elevation or sectional view; Fig. 2, a transverse view; Fig. 3, is an enlarged view of a section of the endless saw; Fig. 4, a transverse view of Fig. 3.

A, the endless sectional saw; B, B, the wheels or pulleys upon which the saw is mounted; C, C, the plumber blocks having set screws D, D, D, D, by which the saw is strained or tightened; E, the guide plates; F, F, F, F, the saw guides; G, the saw teeth; I, the wedge to hold the saw teeth; H, the frame of the machine.

To enable others skilled in the art to make and use my invention I will proceed to describe its construction and operation.

I build my mill in any suitable form with such arrangement of carriage and feed motion as may be desired, to which I attach the shafts bearing the pulleys, B, B, in connection with the plumber blocks, C, C. The pulleys B, B, I make a hexagon or six sided wheel. They can be made in any other form from a four to an eight square as may be desired. Upon these pulleys the endless saw A, is mounted, which is made in any desired number of sections hinged together. In making these sections I take a thin plate of steel and wrap around it longitudinally another thin plate of steel nearly double the width of the first piece, leaving a space between the double of the wide piece and the edge of the narrow piece, thus wrapping or plaiting the wide piece upon the narrow piece by riveting them together, or take two plates and in place of the double insert a narrow strip and rivet through it, leaving a space between the strip and center piece of the saw. I leave a portion of the center piece projecting beyond or back of the edges of the wide piece or outside plates, the object of which is that this projecting portion of the center piece shall pass between the lips of the guide plate, E, when in operation as described below. In forming the places for inserting the teeth, G, I cut or file equal spaces in the double of the wide piece or through the strip and outside plates, thereby leaving the remaining portions of the wide piece, by which the space between the double and the inside edge of the narrow piece forms a socket in which I insert the shank of the tooth, G, and secure it there by means of the wedge, I. In forming the hinges I wrap pieces of steel over the ends of the center plate and rivet them there, then cut or file suitable spaces in the wrapped or capped ends for forming the hinges and insert the bolt, thereby hinging the sections together, which may be done by other forms of hinging or connecting, as may be found expedient. I make the cutting part of the saw teeth in any desired form, not confining myself to any one.

In making and arranging the guide plate, E, I take thin steel plate of the same or near the thickness of the center piece of the saw plate and of sufficient length to pass through the largest logs to be sawed and be firmly secured at each end to the frame of the mill above and below where the logs pass through in sawing. To this piece of steel I attach similar pieces on each side by riveting, with their edges projecting over the edge of the center piece, thereby forming lips and consequently a groove or socket in which the projecting portion of the narrow piece of the saw shall run when in operation and thus form a guide to prevent the saw from twisting or turning out of its proper course; or the sectional saw, A, can be made of single pieces thicker on the serrated or teeth edge and thinner on the back edges and hinged together at the ends so that they can run in the groove of the guide plate, E, which will pass through the log as it is brought up on the ways by the feed motion as the saw cuts the way. On each side of the saw above and below where it passes through the log I place the guides, F, F, F, F, the lower ones stationary, the upper ones stationary or adjustable to the size of the log. These guides may be made with a stationary or fixed fan to meet the sides of the saw plate or there may be friction rollers for the saw plates to pass between.

Having thus described my invention what

I claim and desire to secure by Letters Patent is—

1. The form and manner of constructing the sections of my saw substantially as set forth.

2. I claim the mode of inserting the teeth in the saw in the manner set forth.

3. I claim the guide plate, E, constructed and arranged as described, when used in connection with the saw as set forth.

HARVEY BROWN.

Witnesses:
WILLIAM T. GRAFF,
WILLIAM JOHNSTON.